(12) United States Patent
Nachman et al.

(10) Patent No.: US 10,402,087 B2
(45) Date of Patent: Sep. 3, 2019

(54) ADAPTIVE KEYBOARD FOR ULTRA-MOBILE DEVICES

(75) Inventors: Lama Nachman, Santa Clara, CA (US); Rahul C. Shah, San Francisco, CA (US); Jonathan J Huang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 12/240,904

(22) Filed: Sep. 29, 2008

(65) Prior Publication Data

US 2010/0079310 A1 Apr. 1, 2010

(51) Int. Cl.
*G06F 3/02* (2006.01)
*G06F 3/0488* (2013.01)
*G06F 3/023* (2006.01)

(52) U.S. Cl.
CPC ........ *G06F 3/04886* (2013.01); *G06F 3/0233* (2013.01); *G06F 3/0238* (2013.01)

(58) Field of Classification Search
CPC ........ G06F 3/02; G06F 3/0216; G06F 3/0238; G06F 3/0426
USPC .............. 341/20, 21, 22; 345/168, 172, 173
See application file for complete search history.

(56) References Cited

U.S. PATENT DOCUMENTS

| | | | |
|---|---|---|---|
| 6,779,060 B1 * | 8/2004 | Azvine et al. | 710/65 |
| 6,889,361 B1 * | 5/2005 | Bates et al. | 715/257 |
| 7,194,239 B2 * | 3/2007 | Mantyjarvi et al. | 455/66.1 |
| 2003/0017844 A1 * | 1/2003 | Yu | 455/556 |
| 2003/0048205 A1 * | 3/2003 | He | 341/26 |
| 2004/0104896 A1 * | 6/2004 | Suraqui | G06F 3/04886 345/168 |
| 2004/0222638 A1 * | 11/2004 | Bednyak | 290/1 R |
| 2005/0206730 A1 * | 9/2005 | Hagiwara | 348/169 |
| 2006/0077179 A1 * | 4/2006 | Hsu et al. | 345/168 |
| 2007/0036603 A1 * | 2/2007 | Swoboda | 400/472 |
| 2007/0067373 A1 * | 3/2007 | Higgins et al. | 707/206 |
| 2009/0058823 A1 * | 3/2009 | Kocienda | 345/173 |

FOREIGN PATENT DOCUMENTS

WO WO-2007014064 A2 * 2/2007 ......... G06F 3/04886

OTHER PUBLICATIONS

Huang et al., "Mipad: A Next Generation PDA Prototype." International Conference on Spoken Language Processing. vol. 3, pp. 33-36, ISCA, Beijing, China, Oct. 16-20, 2000.

Fitrianie et al., "An Adaptive Keyboard With Personalized Language-Based Features." Text, Speech and Dialogue, 10th International Conference, pp. 131-138, TSD-2007, Pilsen, Czech Republic, Sep. 3-7, 2007, Proceedings 2007.

* cited by examiner

*Primary Examiner* — Stacy Khoo
(74) *Attorney, Agent, or Firm* — Jordan IP Law, LLC

(57) ABSTRACT

A method is provided. The method includes receiving inputs typed by a user of a keyboard and analyzing the inputs to identify typing errors made by the user. The method also includes customizing a layout of the keyboard to reduce the identified typing errors.

20 Claims, 6 Drawing Sheets

ADAPTIVE KEYBOARD FOR ULTRA-MOBILE DEVICES

BACKGROUND

With recent advancements in the telecommunication services, compact personal computing devices such as personal digital assistants (PDA's), mobile phones and miniature notebook computers with variations in keyboard layout and designs have been developed. Typically, such devices are designed to reduce dimensions and weight of the device. However, this limits space allocated for the keyboard and the display in the device.

Some devices employ touch screens and soft keyboards to maximize the screen size of such devices. However, it is challenge to achieve a tradeoff between the space allocated for the keyboard and the display. Though maximizing the display size is desirable, this may result in an unusable keyboard reducing the efficiency of data entry through the keyboard.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As discussed in detail below, the embodiments of the present invention function to provide a method of customizing a keyboard of a device. In particular, the technique monitors typing errors made by a user of the keyboard and dynamically changes the layout of the keyboard for reducing such errors.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
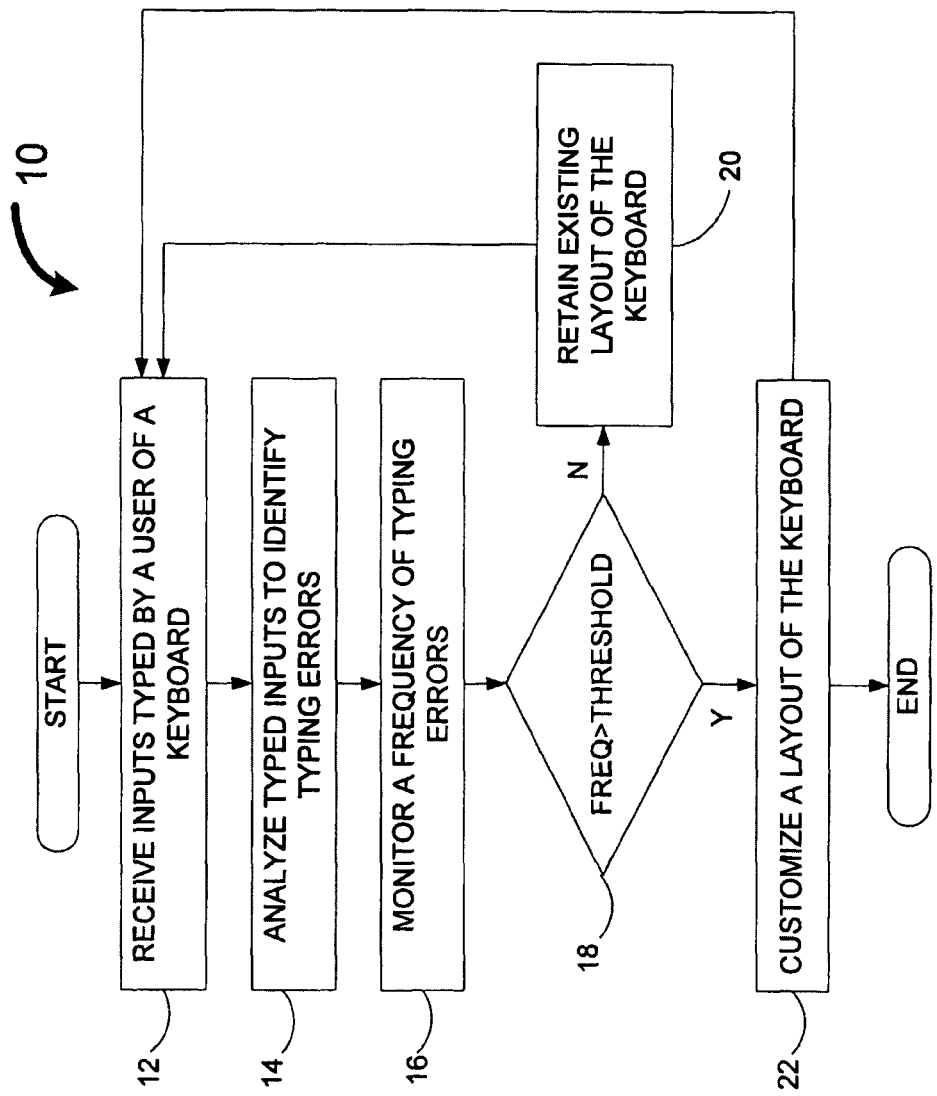
FIG. 1 illustrates a method of customizing a keyboard in accordance with embodiments of present technique.

Referring first to FIG. 1, a method 10 of customizing a keyboard is illustrated. In certain embodiments, the keyboard is a component of a portable computing device such as a mobile phone, a personal digital assistant (PDA) and a mobile internet device (MID), among others. In this exemplary embodiment, the keyboard includes a plurality of keys for typing inputs for the device.

At block 12, inputs typed by a user through the keyboard of the device are received. Such inputs include letters, words or other entries typed through the keyboard. At block 14, the received inputs are analyzed to identify typing errors made by the user. In one exemplary embodiment, analyzing the inputs comprises monitoring dictionary replacement of words typed by the user. In another exemplary embodiment, analyzing the inputs comprises monitoring manual replacement of words or letters typed by the user.

In certain embodiments, the typing error comprises an incorrect letter typed using a key that is adjacent to a key corresponding to a correct letter. For example, since the keys for the letters 'a' and 's' are adjacent to each other on a keyboard, a user may type letter 'a' as an incorrect entry while he/she intended to type letter 's' as a correct entry.

In certain embodiments, a typing pattern of the user is monitored to identify the typing errors. For example, once a user realizes an entry of an incorrect entry, the user may push the backspace key followed by the key for the correct entry. In certain embodiments, the user may realize the typing of an incorrect entry after typing multiple entries through the keyboard. In one embodiment, the user may push the backspace key multiple times to delete the incorrect entry and type the correct entry. In an alternate embodiment, the user may perform a block replacement of the incorrect entry followed by typing multiple entries to change the whole word. Thus, such typing patterns including usage of backspace key and block replacement of words may be analyzed to identify any typing errors made through the keyboard layout.

At block 14, a frequency of occurrence of the typing errors is monitored. In one embodiment, a plurality of typing errors made by using adjacent keys of the keys corresponding to correct entries are monitored. Further, a frequency of occurrence of each of the plurality of typing errors is monitored. At block 18, the frequency of occurrence of each of the plurality of typing errors is compared with a pre-determined threshold. In one embodiment, the pre-determined threshold may be defined by a user of the device. If the frequency of occurrence of the typing errors is within the pre-determined threshold, an existing layout of the keyboard is retained (block 20).

Alternatively, if the frequency of occurrence of the typing errors, the layout of the keyboard is customized to reduce the typing errors (block 22). In certain embodiments, a size of one or more keys of the keyboard is adjusted to reduce the typing errors. In one embodiment, a size of at least one key is changed relative to one or more adjacent keys, wherein the typing error is made using the one or more adjacent keys. In certain embodiments, the size of the at least one key is increased relative to the one or more adjacent keys. In certain other embodiments, the size of the at least one key is reduced relative to the one or more adjacent keys.

In one exemplary embodiment, a spacing between one or more keys of the keyboard is adjusted to reduce the typing errors. In another exemplary embodiment, a shape of the one or more keys is modified to reduce the typing errors. In certain embodiments, the layout of the keyboard is customized based upon an operating condition of the user. Examples of the operating conditions include, but are not limited to, use of the keyboard while the user is walking, use of the keyboard while the user is stationary, operating the keyboard using single hand and operating the keyboard using both hands.

Figure 2:
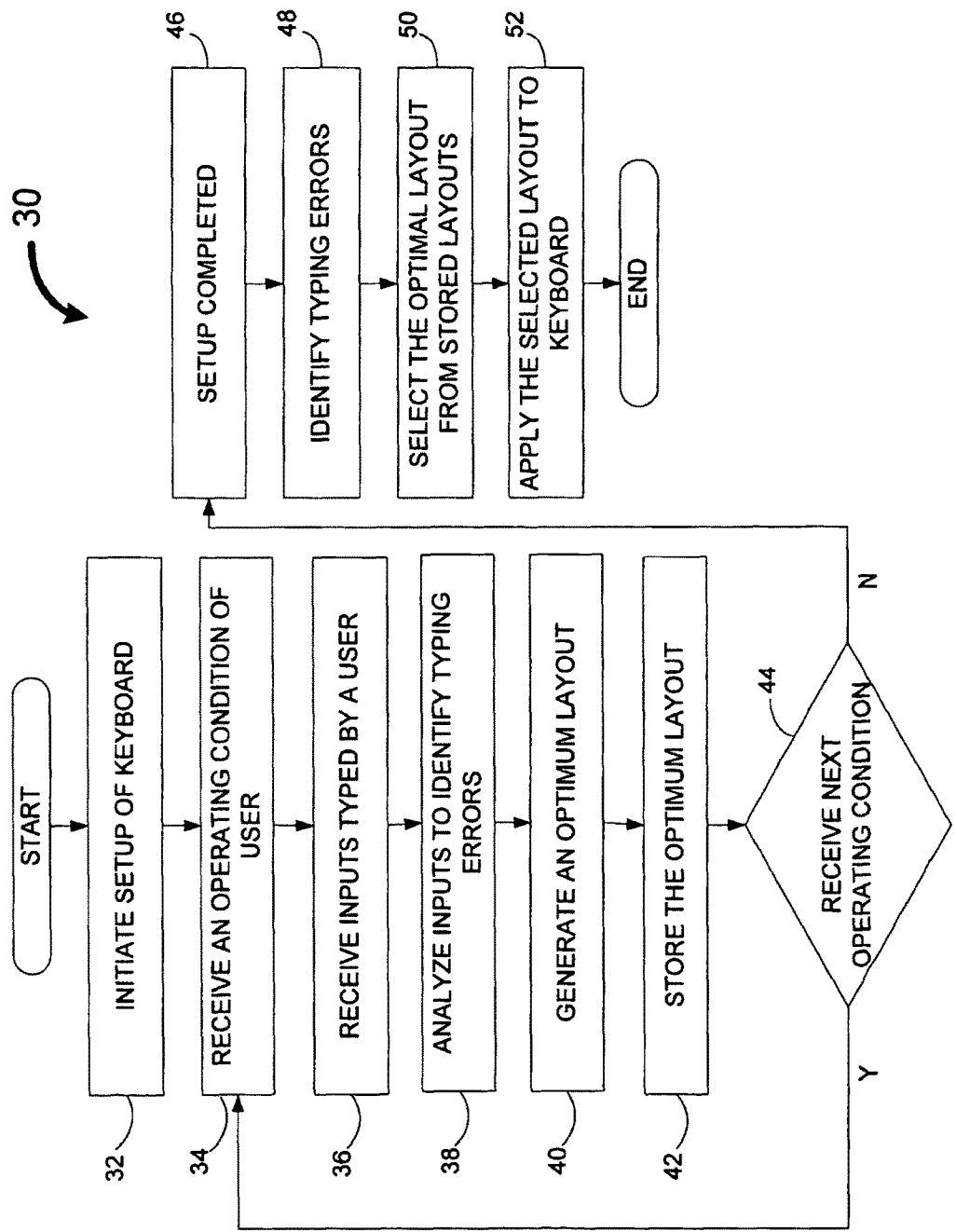
FIG. 2 illustrates an exemplary method for customizing the layout of the keyboard of the device in accordance with embodiments of present technique.

As described above, the layout of the keyboard may be dynamically customized to reduce typing errors made by the user. Once the keyboard is customized (block 22) for reducing the identified typing errors, it receives the next set of inputs (block 12) and repeats the process described above. FIG. 2 illustrates an exemplary method 30 for customizing the layout of the keyboard of the device. At block 32, setup of the keyboard is initiated. In one exemplary embodiment, the setup of the keyboard is performed once the user acquires the device. In another exemplary embodiment, the setup of the keyboard may be performed with a change in a usage modality of the device.

At block 34, an operating condition of the user may be received by the keyboard. Examples of the operating condition include, but are not limited to, use of the keyboard while the user is walking, use of the keyboard while the user is stationary, operating the keyboard using single hand and operating the keyboard using both hands. In one exemplary embodiment, the operating condition includes typing inputs using thumbs of both hands. In another exemplary embodiment, the operating condition comprises holding the device in one hand and typing inputs using an index finger of the other hand. In yet another exemplary embodiment, the operating condition comprises holding the device in one hand and typing inputs using thumb of the other hand. A variety of other operating conditions may be envisaged.

At block 36, inputs typed by the user are received. In this exemplary embodiment, the inputs correspond to the operating condition of the user. Such inputs include letters, words or other entries typed through the keyboard. Further, at block 38, the typed inputs are analyzed to identify typing errors made by the user. At block 40, an optimum layout is generated to reduce the typing errors. Again, generating the optimum layout may include adjusting a size of one or more keys of the keyboard, or adjusting a spacing between the one or more keys, or changing a shape of one or more keys. At block 42, the generated optimum layout is stored.

At block 44, any input for next operating condition is checked. If there are no further inputs for operating conditions, the setup is completed (block 46). If there is an input for another operating condition, the process described above is repeated to generate another optimum layout corresponding to the operating condition. Thus, a plurality of layouts of the keyboard are generated corresponding to a plurality of operating conditions of the user. The plurality of layouts corresponding to each of the plurality of operating conditions are stored to complete the set-up.

During operation, the inputs typed by the user are analyzed to identify the typing errors (block 48). In certain embodiments, the typing error comprises an incorrect letter typed using a key that is adjacent to a key corresponding to a correct letter. At block 50, the device selects an optimum layout of the keyboard from the stored layout depending upon the current operating condition. Further, the selected layout is then applied to the keyboard (block 52).

Figure 3:
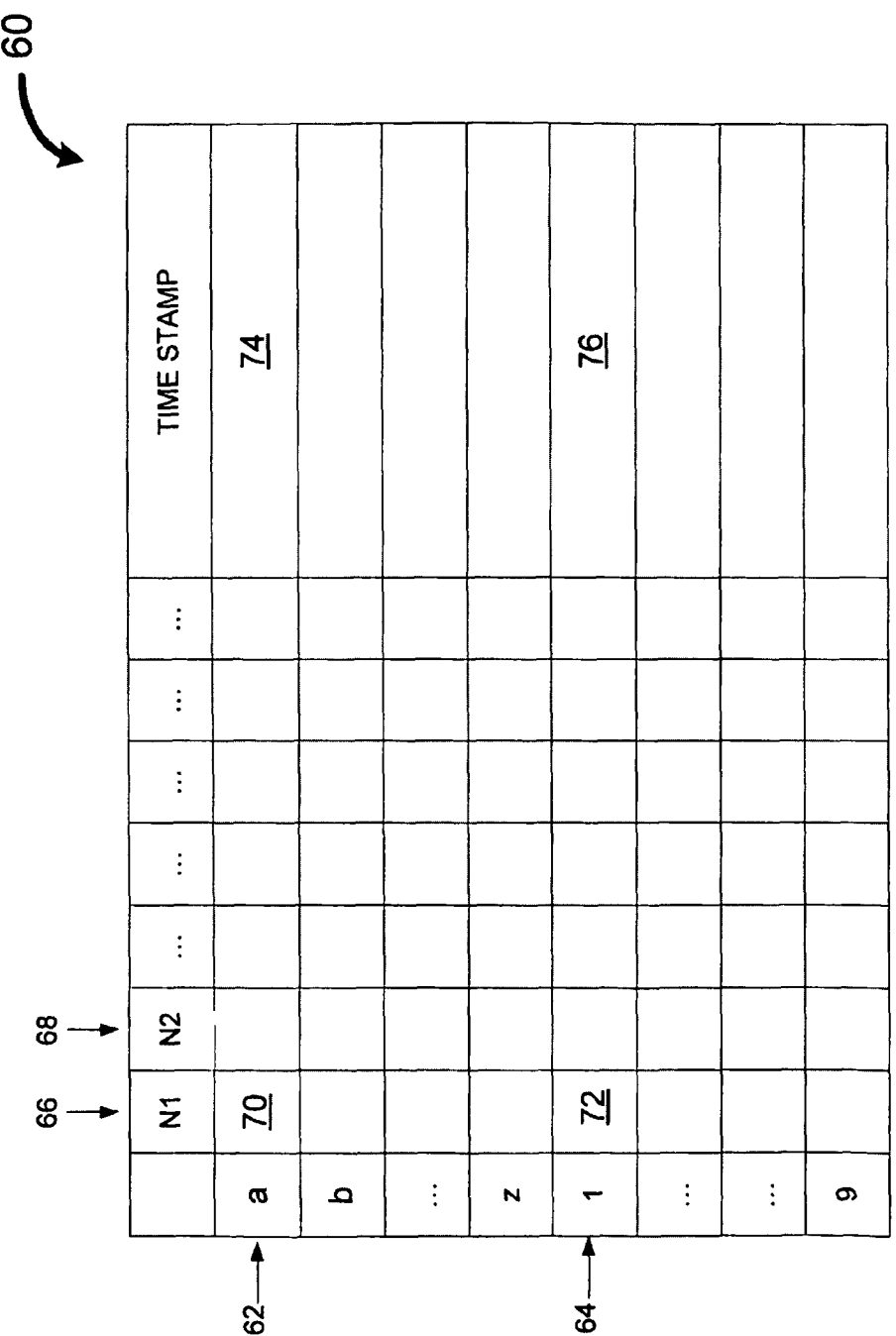
FIG. 3 illustrates an exemplary table for recording typing errors made by a user of the keyboard in accordance with embodiments of present technique.

FIG. 3 illustrates an exemplary table 60 for recording typing errors made by a user of the keyboard. In this exemplary embodiment, entries in rows such as represented by reference numerals 62 and 64 correspond to entries such as letters and numbers on the keyboard. Further, entries in columns such as 66 and 68 correspond to an entry adjacent to the entries such as 62 and 64. In this exemplary embodiment, entries in cells such as represented by 70 and 72 correspond to a frequency of occurrence of a typing error is made by typing an incorrect letter such as 66 and 68 using an adjacent key to key corresponding to correct letters 62 and 64. Further, a time stamp represented by entries such as 74 and 76 is associated with each row to facilitate aging of the entries.

Once the counter is incremented, the frequency of occurrence 70, 72 of each typing error is compared with a pre-determined threshold. If the frequency of occurrence 70 and 72 is greater than the pre-determined threshold, the layout of the keyboard is customized to reduce the frequency of corresponding typing error. In certain embodiments, different thresholds may be selected based upon typing errors due to an incorrect entry made using a single adjacent key and for typing errors made using different adjacent keys.

Figure 4:
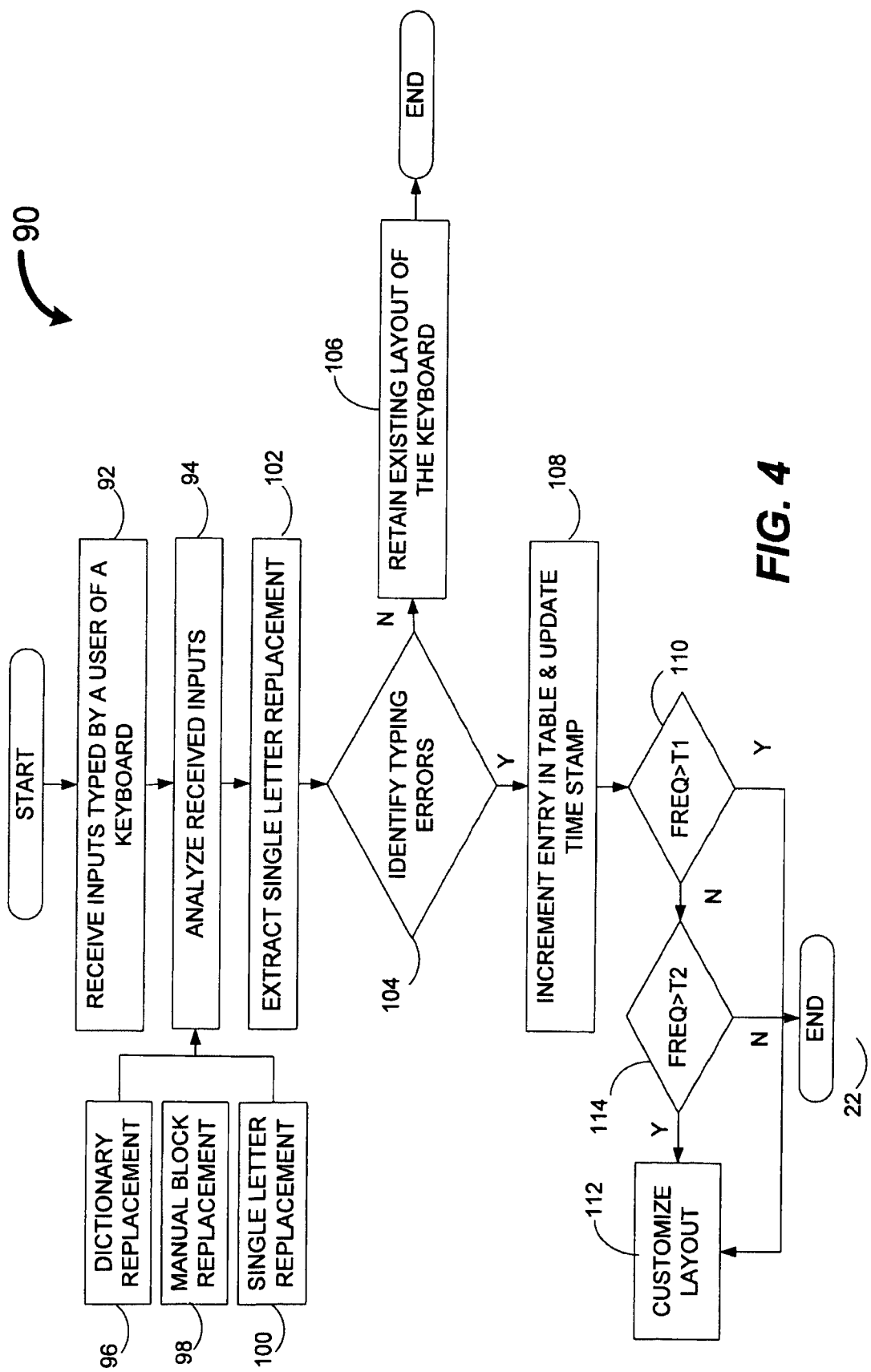
FIG. 4 illustrates an exemplary method for customizing the layout of the keyboard of the device in accordance with embodiments of present technique.

FIG. 4 illustrates an exemplary method 90 for customizing the layout of the keyboard of the device. At block 92, inputs typed by the user of the keyboard are received. At block 94, the inputs are analyzed to identify typing errors. In this exemplary embodiment, the dictionary replacement of words typed by the user, manual block replacement of letters and a single letter replacement are tracked to identify the typing errors (blocks 96, 98 and 100). Further, from each of these inputs, a single letter replacement is extracted to identify typing errors made due to the layout of the keyboard (block 102).

Further, at block 104, the typed inputs are analyzed to identify typing errors made by the user. As described before the typing errors may include an incorrect letter typed using a key that is adjacent to a key corresponding to a correct letter. If there is no identified typing error, the layout of the keyboard is retained (block 106). If a typing error is identified, the frequency of occurrence of the typing error is recorded and the time stamp is updated in a table such as illustrated in FIG. 3 (block 108). At block 110, the frequency of occurrence entered in rows such as 62 and 64 (see FIG. 3) is compared with a first pre-determined threshold (T1). If the frequency of occurrence is greater than the first pre-determined threshold, the keyboard is customized to reduce such occurrence of the typing error (block 112).

Alternatively, if the frequency of occurrence for the entries 62 and 64 is lesser than the first threshold, the frequency of occurrence entered in columns such as 66 and 68 is compared to a second pre-determined threshold (T2) (block 114). Again, if such frequency of occurrence is greater than the second pre-determined threshold, the keyboard is customized to reduce such occurrence of typing error (block 112).

In this exemplary embodiment, the first and second pre-determined thresholds correspond to typing errors due to an incorrect entry made using a single adjacent key and for typing errors made using multiple adjacent keys respectively. In one embodiment, the first and second pre-determined threshold may be defined by a user of the device. As described above, parameters such as size of one or more keys of the keyboard, or the spacing between the one or more keys, or a shape of one or more keys may be adjusted to reduce the typing errors. In certain embodiments, a customization assembly may be coupled to a device for customizing the layout of a keyboard based upon typing errors made by the user.

Figure 5:
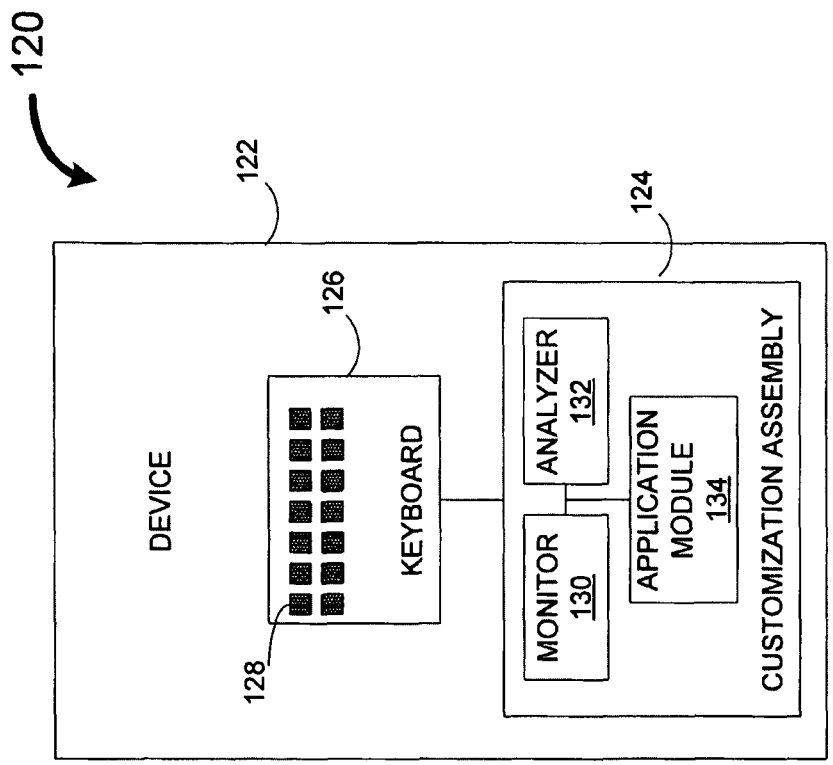
FIG. 5 illustrates an exemplary device with a customization assembly coupled to a keyboard of the device in accordance with embodiments of present technique.

FIG. 5 illustrates an exemplary configuration 120 of a device 122 with a customization assembly 124 coupled the device 122. As illustrated, the customization assembly 124 is coupled to a keyboard 126 of the device 122. In certain embodiments, the device 122 includes a portable computing device such as a mobile phone, a personal digital assistant (PDA) and a mobile internet device (MID). In this embodiment, the keyboard 126 includes a plurality of keys 128 to provide inputs from a user (not shown) to the device 122. Further, the customization assembly 124 includes a monitor 130 to receive inputs and identify typing errors based upon the inputs from the user. The customization assembly 124 also includes an analyzer 132 to generate a layout of the keyboard 126 for reducing the typing errors. In this exemplary embodiment, parameters of the layout such as size of one or more keys 128 of the keyboard 126, or the spacing between the one or more keys 128, or a shape of one or more keys 128 may be adjusted to reduce the typing errors. In one exemplary embodiment, a capture area below the one or more keys may be adjusted to reduce the typing errors.

In addition, the customization assembly 124 includes an application module 134 to apply the generated layout to the keyboard 126. In this exemplary embodiment, the application module 134 changes the size, spacing, or shape of the keys 128 in accordance with the generated layout to reduce the typing errors. In certain embodiments, the size, spacing and the shape of the keys 128 are adjusted relative to adjacent keys that cause the typing errors. In one embodiment, spacing of one or more keys is uniform relative to the adjacent keys. In another embodiment, the spacing between one or more keys is non-uniform relative to the adjacent keys.

Figure 6:
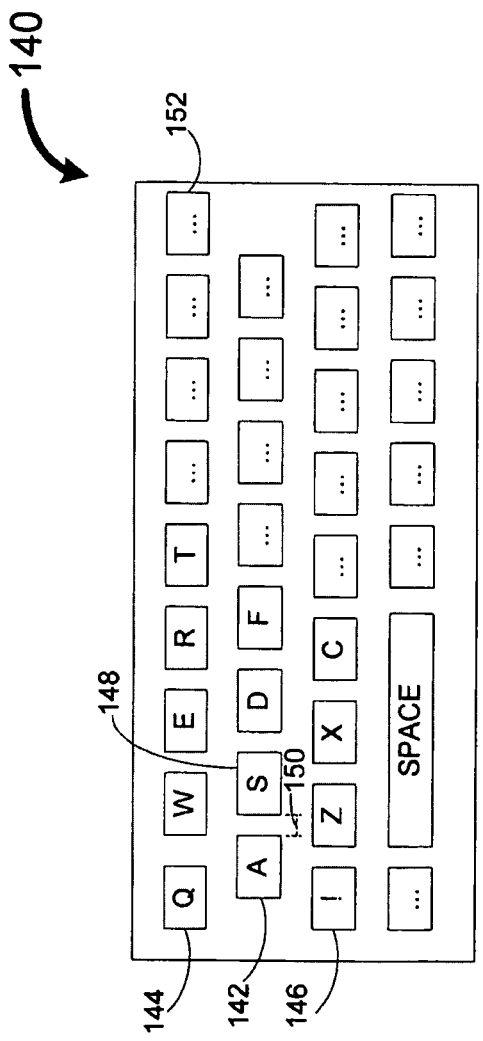
FIG. 6 illustrates an exemplary configuration of a layout of the keyboard of FIG. 5 in accordance with embodiments of present technique.

FIG. 6 illustrates an exemplary configuration 140 of a layout of the keyboard 124 of FIG. 5. As illustrated, the keyboard 124 includes keys such as represented by reference numerals 142, 144, 146 and 148. As described above, a typing pattern of a user (not shown) is monitored and certain parameters of the layout 140 may be adjusted to reduce the typing errors made by the user. Examples of such parameters include, size of one or more keys, a spacing between one or more keys and shape of the one or more keys.

For example, if the monitor 130 (see FIG. 5) determines that the typing error is made using keys 144 and 146 instead of using the key 142 for typing letter 'a' then a size of the key 142 may be increased. In one exemplary embodiment, the size of the key 142 may be increased uniformly in all directions. In another exemplary embodiment, the size of the key 142 may be increased in each direction based upon the frequency of occurrence of typing errors made using each of the adjacent keys 144 and 146. Such frequency may be determined from the table 60 described above with reference to FIG. 3.

In another embodiment, if the monitor 130 determines that the typing error is made using a single key such as 148 then a spacing 150 between the keys 142 and 148 may be increased. In one exemplary embodiment, if the monitor 130 determines that there is no typing error made using a key such as 152, then a size of the key 152 may be reduced. This enables better utilization of a screen for display and keyboard functionality. Once the modified layout of the keyboard 140 is generated, the details of the layout are sent to the application module 134 (see FIG. 5). The application module 134 applies the changed parameters such as modified size of one or more keys such as 142, spacing 150 between one or more keys such as 142 and 144 and so forth.

Figure 7:
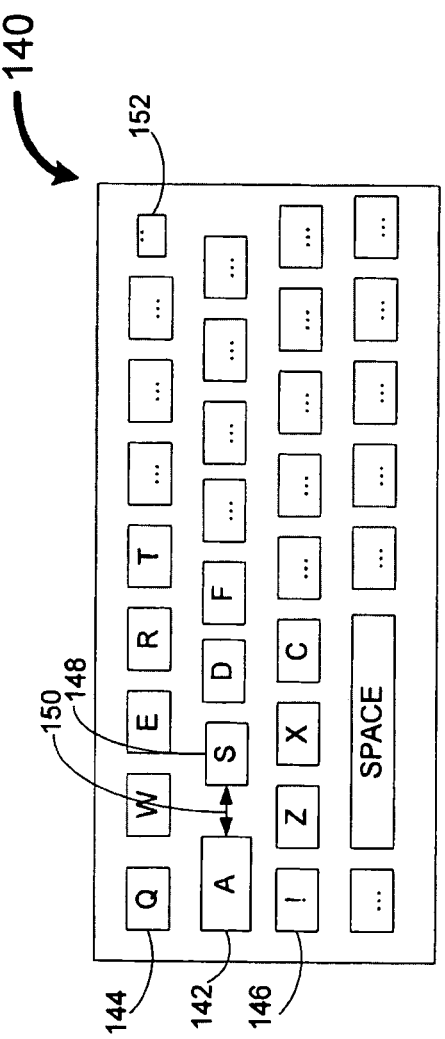
FIG. 7 illustrates an exemplary modified layout of the keyboard of FIG. 6 in accordance with embodiments of present technique.

FIG. 7 illustrates an exemplary modified layout 160 of the keyboard 140 of FIG. 6. As illustrated, based upon the typing errors analyzed by the monitor 130, parameters of the layout 160 are adjusted to reduce the typing errors. In this exemplary embodiment, a size of the key 142 is increased relative to adjacent keys such as 144 and 146 to reduce the errors caused by typing using these keys 144 and 146. Further, the spacing 150 between the keys 142 and 148 is increased and the size of the key 152 is reduced for better utilization of space on the keyboard. Thus, a plurality of parameters of the layout 160 may be modified to reduce the typing errors made by the user of the keyboard 140.

As noted above, by using an algorithm embodying aspects of the present invention, one can customize the layout of the keyboard of a device based upon typing errors made by the user. As will be appreciated by those of ordinary skill in the art, the foregoing example, demonstrations, and process steps may be implemented by suitable code on a processor-based system.

It should also be noted that different implementations of the present technique may perform some or all of the steps described herein in different orders or substantially concurrently, that is, in parallel. Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code.

Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

The invention claimed is:

1. A non-transitory computer readable medium comprising a set of instructions which, if executed by a processor, cause a computer to:

identify a first operating condition, wherein the first operating condition is a current usage modality of a computing device having a keyboard;

analyze first inputs, that are typed through the keyboard in association with the first operating condition, to identify first typing errors by an identification of one or more of dictionary replacement of words, manual block replacement of letters, or a single letter replacement;

modify a first keyboard layout of the keyboard based on the first typing errors, and to reduce a size of a first key of the keyboard in response to an identification that no typing error is made with the first key in association with the first operating condition;

store the modified first keyboard layout in association with the first operating condition;

analyze current inputs, that are typed through the keyboard in association with a current operating condition, to identify current typing errors by an identification of one or more of dictionary replacement of words, manual block replacement of letters, or a single letter replacement, wherein the current operating condition is a current usage modality of the device;

determine whether a number of the current typing errors exceeds a threshold; and when the number of the current typing errors exceeds the threshold, modify the keyboard to have the modified first keyboard layout in response to an identification that the current operating condition corresponds to the first operating condition.

2. The non-transitory computer readable medium of claim 1, wherein the first operating condition is the same as the current operating condition.

3. The non-transitory computer readable medium of claim 1, wherein the set of instructions which, if executed by the processor, cause the computer to:

identify a second operating condition that is different from the first operating condition, wherein the second operating condition is a current usage modality of the device;

analyze second inputs, that are typed through the keyboard in association with the second operating condition, to identify second typing errors by an identification of one or more of dictionary replacement of words, manual block replacement of letters, or a single letter replacement;

modify a second keyboard layout of the keyboard based on the second typing errors;

store the modified second keyboard layout in association with the second operating condition; and when the number of the current typing errors exceeds the threshold, avoid modification of the keyboard to the modified second keyboard layout in response to an identification that the current operating condition does not correspond to the second operating condition.

4. The non-transitory computer readable medium of claim 1, wherein the set of instructions which, if executed by the processor, cause the computer to:

store a plurality of operating conditions including the first operating condition; and store a plurality of keyboard layouts, including the modified first keyboard layout, in association with the plurality of operating conditions.

5. The non-transitory computer readable medium of claim 1, wherein the current operating condition comprises typing inputs using thumbs of two hands, holding the device with the keyboard in a hand and typing inputs using an index finger of another hand, holding the device with the keyboard in a hand and typing using a thumb of the hand, or combinations thereof.

6. A device, comprising:
a dynamically customizable keyboard having a plurality of keys; and
a customization assembly that is to:
identify a first operating condition, wherein the first operating condition is a current usage modality of the device;
analyze first inputs, that are typed through the keyboard in association with the first operating condition, to identify first typing errors by an identification of one or more of dictionary replacement of words, manual block replacement of letters, or a single letter replacement;
modify a first keyboard layout of the keyboard based on the first typing errors, and to reduce a size of a first key of the plurality of keys of the keyboard in response to an identification that no typing error is made with the first key in association with the first operating condition;
store the modified first keyboard layout in association with the first operating condition;
analyze current inputs, that are typed through the keyboard in association with a current operating condition, to identify current typing errors by an identification of one or more of dictionary replacement of words, manual block replacement of letters, or a single letter replacement, wherein the current operating condition is a current usage modality of the device;
determine whether a number of the current typing errors exceeds a threshold; and
when the number of the current typing errors exceeds the threshold, modify the keyboard to have the modified first keyboard layout in response to an identification that the current operating condition corresponds to the first operating condition.

7. The device of claim 6, wherein the first operating condition is the same as the current operating condition.

8. The device of claim 6, wherein the customization assembly is to:
identify a second operating condition that is different from the first operating condition, wherein the second operating condition is a current usage modality of the device;
analyze second inputs, that are typed through the keyboard in association with the second operating condition, to identify second typing errors by an identification of one or more of dictionary replacement of words, manual block replacement of letters, or a single letter replacement;
modify a second keyboard layout of the keyboard based on the second typing errors;
store the modified second keyboard layout in association with the second operating condition; and
when the number of the current typing errors exceeds the threshold, avoid modification of the keyboard to the modified second keyboard layout in response to an identification that the current operating condition does not correspond to the second operating condition.

9. The device of claim 6, wherein the customization assembly is to:
store a plurality of operating conditions including the first operating condition; and
store a plurality of keyboard layouts, including the modified first keyboard layout, in association with the plurality of operating conditions.

10. The device of claim 6, wherein the current operating condition comprises typing inputs using thumbs of two hands, holding the device with the keyboard in a hand and typing inputs using an index finger of another hand, holding the device with the keyboard in a hand and typing using a thumb of the hand, or combinations thereof.

11. A system, comprising:
a display;
a dynamically customizable keyboard having a plurality of keys; and
a customization assembly that is to:

identify a first operating condition, wherein the first operating condition is a current usage modality of the system;

analyze first inputs, that are typed through the keyboard in association with the first operating condition, to identify first typing errors by an identification of one or more of dictionary replacement of words, manual block replacement of letters, or a single letter replacement;

modify a first keyboard layout of the keyboard based on the first typing errors, and to reduce a size of a first key of the plurality of keys of the keyboard in response to an identification that no typing error is made with the first key in association with the first operating condition;

store the modified first keyboard layout in association with the first operating condition;

analyze current inputs, that are typed through the keyboard in association with a current operating condition, to identify current typing errors by an identification of one or more of dictionary replacement of words, manual block replacement of letters, or a single letter replacement, wherein the current operating condition is a current usage modality of the system;

determine whether a number of the current typing errors exceeds a threshold; and when the number of the current typing errors exceeds the threshold, modify the keyboard to have the modified first keyboard layout in response to an identification that the current operating condition corresponds to the first operating condition.

12. The system of claim 11, wherein the first operating condition is the same as the current operating condition.

13. The system of claim 11, wherein the customization assembly is to:

identify a second operating condition that is different from the first operating condition, wherein the second operating condition is a current usage modality of the system;

analyze second inputs, that are typed through the keyboard in association with the second operating condition, to identify second typing errors by an identification of one or more of dictionary replacement of words, manual block replacement of letters, or a single letter replacement;

modify a second keyboard layout of the keyboard based on the second typing errors;

store the modified second keyboard layout in association with the second operating condition; and when the number of the current typing errors exceeds the threshold, avoid modification of the keyboard to the modified second keyboard layout in response to an identification that the current operating condition does not correspond to the second operating condition.

14. The system of claim 11, wherein the customization assembly is to:

store a plurality of operating conditions including the first operating condition; and store a plurality of keyboard layouts, including the modified first keyboard layout, in association with the plurality of operating conditions.

15. The system of claim 11, wherein the current operating condition comprises typing inputs using thumbs of two hands, holding the system with the keyboard in a hand and typing inputs using an index finger of another hand, holding the system with the keyboard in a hand and typing using a thumb of the hand, or combinations thereof.

16. A method comprising:

identifying a first operating condition, wherein the first operating condition is a current usage modality of a computing device having a keyboard;

analyzing first inputs, that are typed through the keyboard in association with the first operating condition, to identify first typing errors by an identification of one or more of dictionary replacement of words, manual block replacement of letters, or a single letter replacement;

modifying a first keyboard layout of the keyboard based on the first typing errors, wherein the modifying the first keyboard layout includes a reduction in a size of a first key of the keyboard in response to an identification that no typing error is made with the first key in association with the first operating condition;

storing the modified first keyboard layout in association with the first operating condition;

analyzing current inputs, that are typed through the keyboard in association with a current operating condition, to identify current typing errors by an identification of one or more of dictionary replacement of words, manual block replacement of letters, or a single letter replacement, wherein the current operating condition is a current usage modality of the device;

determining whether a number of the current typing errors exceeds a threshold; and when the number of the current typing errors exceeds the threshold, modifying the keyboard to have the modified first keyboard layout in response to an identification that the current operating condition corresponds to the first operating condition.

17. The method of claim 16, wherein the first operating condition is the same as the current operating condition.

18. The method of claim 16, further comprising:

identifying a second operating condition that is different from the first operating condition, wherein the second operating condition is a current usage modality of the device;

analyzing second inputs, that are typed through the keyboard in association with the second operating condition, to identify second typing errors by an identification of one or more of dictionary replacement of words, manual block replacement of letters, or a single letter replacement;

modifying a second keyboard layout of the keyboard based on the second typing errors;

storing the modified second keyboard layout in association with the second operating condition; and when the number of the current typing errors exceeds the threshold, avoiding modification of the keyboard to the modified second keyboard layout in response to an identification that the current operating condition does not correspond to the second operating condition.

19. The method of claim 16, further comprising:

storing a plurality of operating conditions including the first operating condition; and storing a plurality of keyboard layouts, including the modified first keyboard layout, in association with the plurality of operating conditions.

20. The method of claim 16, wherein the current operating condition comprises typing inputs using thumbs of two hands, holding the device with the keyboard in a hand and typing inputs using an index finger of another hand, holding the device with the keyboard in a hand and typing using a thumb of the hand, or combinations thereof.

* * * * *